United States Patent
Balaji et al.

(10) Patent No.: US 12,530,677 B2
(45) Date of Patent: Jan. 20, 2026

(54) MACHINE LEARNING BASED SYSTEM FOR PROCESSING DEVICE TELEMETRY IN A DISTRIBUTED COMPUTING ENVIRONMENT

(71) Applicant: BANK OF AMERICA CORPORATION, Charlotte, NC (US)

(72) Inventors: Sujatha Balaji, Chennai (IN); Mullaikani Anbazhagan, Chennai (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 195 days.

(21) Appl. No.: 18/125,295

(22) Filed: Mar. 23, 2023

(65) Prior Publication Data

US 2024/0320660 A1 Sep. 26, 2024

(51) Int. Cl.
*G06Q 20/36* (2012.01)
(52) U.S. Cl.
CPC ................................ *G06Q 20/3678* (2013.01)
(58) Field of Classification Search
CPC ...................................................... G06Q 40/00
See application file for complete search history.

(56) References Cited

U.S. PATENT DOCUMENTS

| | | | | |
|---|---|---|---|---|
| 5,297,032 A * | 3/1994 | Trojan | ................... | G06Q 40/04 705/37 |
| 5,761,442 A * | 6/1998 | Barr | ....................... | G06Q 40/06 705/36 R |
| 5,812,988 A * | 9/1998 | Sandretto | ............... | G06Q 40/00 702/179 |
| 6,009,402 A * | 12/1999 | Whitworth | ............. | G06Q 40/08 705/400 |
| 6,014,645 A * | 1/2000 | Cunningham | ......... | G06Q 40/00 235/379 |
| 6,058,379 A * | 5/2000 | Odom | .................... | G06Q 40/04 705/37 |
| 6,313,833 B1 * | 11/2001 | Knight | .................. | G06Q 40/06 705/37 |
| 6,345,090 B1 * | 2/2002 | Walker | .................. | G06Q 40/04 379/114.03 |
| 6,954,758 B1 * | 10/2005 | O'Flaherty | ............ | G06Q 30/02 707/999.102 |

(Continued)

*Primary Examiner* — Kirsten S Apple
(74) *Attorney, Agent, or Firm* — Moore & Van Allen PLLC; Anup Iyer

(57) ABSTRACT

Real-time transmission of IoT telemetry data to a third-party and use of such data by the third-party for purposes of determining IoT device-related recommendations specific to the IoT device user. Machine learning models receive the IoT telemetry data, as a least a part of the inputs, to determine recommendations that are tied to the IoT device and specific to the IoT device user. Non Fungible Tokens (NFTs) are minted by the IoT device manufacturer/distributor and hold a link to an IoT device identifier and an IoT device user identifier and include a smart contract formed between the third-party and the IoT device user that defines the criteria for the telemetry data that is to be acquired by the third-party. Use of the NFT allows for IoT gateways/data listeners to determine which IoT telemetry data is to be transmitted to the third-party and allows for the transmission to occur without identifying the IoT user in the transmissions.

20 Claims, 10 Drawing Sheets

(56) References Cited

U.S. PATENT DOCUMENTS

| | | | | |
|---|---|---|---|---|
| 7,165,037 B2* | 1/2007 | Lazarus | G06Q 30/0269 | 705/7.31 |
| 7,376,431 B2* | 5/2008 | Niedermeyer | G07C 9/22 | 379/189 |
| 8,104,678 B2* | 1/2012 | Yoshikawa | G06Q 20/4037 | 235/492 |
| RE43,435 E* | 5/2012 | Krause | G06Q 40/06 | 705/37 |
| 8,219,482 B2* | 7/2012 | Neri | G06Q 40/04 | 705/37 |
| 8,234,201 B1* | 7/2012 | Canabarro | G06Q 40/06 | 705/36 R |
| 8,412,605 B2* | 4/2013 | Griffin | G06Q 40/02 | 705/76 |
| 8,452,681 B2* | 5/2013 | Clements | G06Q 40/04 | 705/37 |
| 8,825,456 B2* | 9/2014 | Vasudevan | G06T 7/521 | 703/2 |
| 9,176,789 B2* | 11/2015 | Lowes | G06F 9/5083 | |
| 9,727,909 B2 | 8/2017 | Mackay | | |
| 9,760,910 B1* | 9/2017 | Tuchman | G06Q 50/01 | |
| 9,794,074 B2 | 10/2017 | Toll | | |
| 10,084,762 B2 | 9/2018 | Versteeg | | |
| 10,146,792 B1 | 12/2018 | Dobrek | | |
| 10,958,211 B1* | 3/2021 | Sarwat | H02J 3/004 | |
| 10,977,110 B2* | 4/2021 | Matei | G06N 5/01 | |
| 11,139,955 B1 | 10/2021 | So | | |
| 11,501,297 B1 | 11/2022 | Tai | | |
| 2002/0161677 A1* | 10/2002 | Zumbach | G06Q 40/00 | 707/E17.001 |
| 2002/0184134 A1* | 12/2002 | Olsen | G06Q 40/06 | 705/37 |
| 2003/0149648 A1* | 8/2003 | Olsen | G06Q 40/00 | 705/35 |
| 2005/0187854 A1* | 8/2005 | Cutler | G06Q 40/04 | 705/37 |
| 2005/0192899 A1* | 9/2005 | Reardon | G06Q 40/00 | 705/40 |
| 2006/0195391 A1* | 8/2006 | Stanelle | G06Q 40/02 | 705/38 |
| 2007/0244795 A1* | 10/2007 | Lutnick | G06Q 40/04 | 705/37 |
| 2008/0255910 A1* | 10/2008 | Bagchi | G06Q 10/0635 | 705/7.28 |
| 2008/0288326 A1* | 11/2008 | Abramowicz | G06Q 30/0605 | 705/7.29 |
| 2008/0288889 A1* | 11/2008 | Hunt | G06Q 30/02 | 715/810 |
| 2008/0301019 A1* | 12/2008 | Monk | G06Q 20/4016 | 705/35 |
| 2009/0024539 A1* | 1/2009 | Decker | G06Q 40/06 | 705/36 R |
| 2010/0023460 A1* | 1/2010 | Hughes | G06Q 40/06 | 705/36 R |
| 2010/0312701 A1* | 12/2010 | Bosch | G07F 19/20 | 705/43 |
| 2011/0145149 A1* | 6/2011 | Valdes | G06Q 20/102 | 705/44 |
| 2011/0178912 A1* | 7/2011 | Parsons | G06Q 40/04 | 705/35 |
| 2011/0213731 A1* | 9/2011 | Cho | G06Q 50/16 | 705/36 R |
| 2011/0264581 A1* | 10/2011 | Clyne | G06Q 20/10 | 705/39 |
| 2012/0029956 A1* | 2/2012 | Ghosh | G06Q 10/063 | 705/7.11 |
| 2012/0030154 A1* | 2/2012 | Nicholson | G01S 7/003 | 703/2 |
| 2012/0278254 A1* | 11/2012 | Rosenthal | G06Q 40/06 | 705/36 R |
| 2012/0323764 A1* | 12/2012 | Boberski | G06Q 40/04 | 705/39 |
| 2013/0024395 A1* | 1/2013 | Clark | G06Q 40/06 | 705/36 R |
| 2013/0226764 A1* | 8/2013 | Battyani | G06Q 40/04 | 705/37 |
| 2014/0156491 A1* | 6/2014 | Koh | G06Q 40/04 | 705/37 |
| 2014/0229353 A1* | 8/2014 | Lutnick | G06Q 40/04 | 705/37 |
| 2015/0154284 A1* | 6/2015 | Pfeifer | G06F 16/3344 | 707/723 |
| 2016/0314425 A1* | 10/2016 | Cunningham | G06Q 10/06398 | |
| 2016/0371779 A1* | 12/2016 | Stearns | G06Q 40/06 | |
| 2018/0047071 A1* | 2/2018 | Hsu | G06Q 30/0282 | |
| 2019/0081789 A1 | 3/2019 | Madisetti | | |
| 2019/0095880 A1 | 3/2019 | Glover | | |
| 2019/0130399 A1 | 5/2019 | Wright | | |
| 2019/0318348 A1* | 10/2019 | Brenner | G06Q 50/184 | |
| 2019/0370716 A1* | 12/2019 | Kavumpurath | G06F 16/2458 | |
| 2019/0379642 A1* | 12/2019 | Simons | H04L 63/0281 | |
| 2020/0019288 A1* | 1/2020 | D'Amore | H04L 9/3239 | |
| 2020/0143367 A1* | 5/2020 | LeBeau | G06F 21/64 | |
| 2020/0175623 A1* | 6/2020 | Howie | G06Q 50/18 | |
| 2020/0267163 A1* | 8/2020 | Wilson | H04L 9/3271 | |
| 2021/0110477 A1* | 4/2021 | Spangenberg | G06Q 20/36 | |
| 2021/0201404 A1 | 7/2021 | Schwartz | | |
| 2021/0264520 A1* | 8/2021 | Cummings | G06Q 40/12 | |
| 2022/0058630 A1 | 2/2022 | Yantis | | |
| 2022/0058735 A1* | 2/2022 | Chuzhoy | G06Q 40/04 | |
| 2022/0114600 A1 | 4/2022 | Blackburn | | |
| 2022/0129980 A1* | 4/2022 | Son | H04L 9/3239 | |
| 2022/0309475 A1* | 9/2022 | Kurniawan | G06F 16/248 | |
| 2022/0414726 A1* | 12/2022 | Kerber | H04L 9/50 | |
| 2023/0116345 A1* | 4/2023 | Chirochangu | G06Q 10/0635 | 705/7.28 |
| 2023/0281604 A1* | 9/2023 | Robell | G06Q 30/018 | |
| 2023/0298117 A1* | 9/2023 | Barlow | G06Q 40/04 | 705/41 |
| 2023/0419315 A1* | 12/2023 | Togame | G06Q 30/06 | |
| 2024/0106667 A1* | 3/2024 | Batcher | G06Q 40/06 | |

* cited by examiner

MACHINE LEARNING BASED SYSTEM FOR PROCESSING DEVICE TELEMETRY IN A DISTRIBUTED COMPUTING ENVIRONMENT

FIELD OF THE INVENTION

The present invention is related generally to machine learning-based processing of Internet-of-Things (IoT) telemetry data and, more specifically, systems and methods for transmitting IoT telemetry data to third parties through use of a Non-Fungible Token (NFT) that provides a link to an IoT device identifier and IoT device user identifier and subsequently providing the data as inputs to Machine Learning (ML) models to determine recommendations specific to the IoT device and/or IoT device user.

BACKGROUND

IoT devices are devices equipped with computer processing means whereby telemetry data is recorded and wirelessly transmitted to other local IoT devices within a connected IoT network or to an IoT gateway or other edge device where data can either be analyzed locally or communicated to the cloud or other storage means for subsequent analysis.

Typically, the telemetry data transmitted to the IoT gateway is used by the manufacturer of the IoT device for various purposes, which may overall IoT device related (e.g., improve product quality) or may be specific to the user. In certain instances, third-parties may benefit from such telemetry data, as well. However, problems exist in determining what specific telemetry data the third-party is authorized to receive and what events trigger transmission of the telemetry data to the third-party. In addition, problems exist in ensuring that the transmission of such data occurs in secure manner, such that the third-party has verifiable proof that the telemetry data is associated with a specific IoT device and a specific user.

Therefore, a need exists to develop systems, methods, computer program products and the like that serve to transmit specified IoT telemetry data to authorized third parties and using the IoT telemetry data for purposes of determining recommendations that are specific the IoT device and/or user of the IoT device.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing for real-time transmission of IoT telemetry data to a third-party and use of such data by the third-party for purposes of determining IoT device-related recommendations specific to the IoT device user. The invention relies on machine learning models which receive the IoT telemetry data, as a least a part of the inputs, to determine recommendations that are tied to the IoT device and specific to the IoT device user.

In particular the invention relies on Non Fungible Tokens (NFTs) that are minted by the IoT device manufacturer/distributor and hold a link to an IoT device identifier and an IoT device user identifier and include a smart contract formed between the third-party and the IoT device user that defines the criteria for the telemetry data that is to be acquired by the third-party. Use of the NFT allows for IoT gateways/data listeners to determine which IoT telemetry data is to be transmitted to the third-party and allows for the transmission to occur without identifying the IoT user in the transmissions.

In specific embodiments of the invention, real-time transmission of the IoT telemetry data from the IoT gateway to the third-party is realized by implementing a bridge protocol and streaming IoT telemetry data to a cloud computing platform, at which the data is transformed to a Simple Notification System (SNS) format and SNS messages including the telemetry data are pushed to a third-party-side Application Programming Interface (API).

In other specific embodiments of the invention, various features of the invention are executed in a virtual computing environment, such as the Metaverse or the like or result from interactions between the third-party, the IoT device user and the IoT device manufacturer within the virtual computing environment. For example, NFT templates may be issued by the third-party to the IoT device manufacturer, NFT access rights may transferred from the IoT device manufacturer (i.e., NFT minter) to the IoT device user and/or the recommendations may be presented to the IoT device user via the virtual computing environment A system for third-party acquisition of Internet-of-Things (IoT) device telemetry data and using the IoT device telemetry data to determine IoT device-related recommendations, defines first embodiments of the invention. The system includes a first computing platform having a first memory and one or more first processing devices in communication with the first memory. The first memory stores a Non-Fungible Token (NFT) minting and transfer application that is executable by at least one of the one or more first processing devices. The NFT minting and transfer application is configured to receive a plurality of NFT templates issued from a third-party that is requesting acquisition of IoT device telemetry data. The plurality of NFT templates define criteria for acquiring IoT device telemetry data. In response to receiving the plurality of NFT templates, the NFT minting and transfer application is further configured to mint a plurality of NFTs. Each NFT (i) corresponds to a NFT template from amongst the plurality of NFT templates, (ii) provides at least one link to an IoT device identifier and an IoT device user identifier, and (iii) includes a smart contract, formed between the third-party and an IoT device user, and based upon at least a portion of the criteria for acquiring IoT device telemetry data. In response to minting the plurality of NFTs, NFT minting and transfer application is configured to transfer NFT access rights for accessing each of the NFTs to a corresponding IoT device user and the third-party.

The system additionally includes a second computing platform having a second memory and one or more second processing devices in communication with the second memory. The second memory stores an IoT telemetry data listener application that is executable by at least one of the one or more second processing devices. The IoT telemetry data listener application is configured to use the IoT device identifier to query distributed ledgers of a distributed trust computing network that store the plurality of NFTs to determine the criteria for acquiring IoT device telemetry data. In response to determining the IoT device the criteria for acquiring IoT device telemetry data, the IoT telemetry data listener application is configured to listen for IoT device telemetry data that meets the criteria for acquiring IoT device telemetry data and transmit, to the third-party, the IoT device telemetry data that meets the criteria.

The system additionally includes a third computing platform having a third memory and one or more third processing devices in communication with the third memory. The third memory stores a recommendation engine comprising one or more machine-learning algorithms that are executable by at least one of the one or more third processing device. In response to the third-party receiving the IoT device telemetry data and accessing the NFT to identify the IoT device user, the machine learning models are configured to receive inputs that include the IoT device telemetry data, identification of an IoT device from which the IoT device telemetry data was acquired and identification of the IoT device user, and, in response to receiving the inputs, determine one or more IoT device-related recommendations that are specific to the IoT device user.

In specific embodiments of the system, the NFT minting and transfer application is further configured to receive the plurality of NFT templates, wherein the criteria for acquiring the IoT telemetry data includes IoT device events that trigger IoT device telemetry data retrieval and IoT device telemetry data to be retrieved in response to a corresponding IoT device event. In other related embodiments of the system, the criteria for acquiring the IoT telemetry data includes at least one classification of IoT device user.

In other specific embodiments of the system, the NFT minting and transfer application is further configured to receive the plurality of NFT templates wherein each of the plurality of NFT templates include the at least one link, wherein the at least one link is one or more Universal Resource Locators (URLs) associated with an Interplanetary File System (IPFS) storage location.

In other specific embodiments of the system, the first computing platform is controlled by an IoT device manufacturer or distributor, such that the IoT device manufacturer or distributor is the entity that mints the NFT and transmits NFT access to the third-party and IoT device user.

In still further specific embodiments of the system, the second computing platform comprises an edge computing platform configured to provide real-time transmission of the IoT device telemetry data to the third-party. In related embodiments of the system, the edge computing platform implements a bridge protocol to listen for the IoT device events and provide real-time transmission of the IoT device telemetry data to the third-party. In such embodiments of the system, the bridge protocol is configured to provide real-time transmission of the IoT device telemetry data by streaming the IoT telemetry data to a cloud computing platform, transforming, at the cloud computing platform, the IoT telemetry data to Simple Notification Service (SNS) message service format and delivering SNS messages comprising the IoT telemetry device to an Application Programming Interface (API) gateway controlled by the third-party.

In further specific embodiments of the invention, the NFT minting and transfer application is executed and the NFTs are minted as a result of virtual computing environment interaction between at least two of the third-party, the IoT device user and an IoT device manufacturer or distributor. In further related embodiments of the system, the recommendation engine further comprises recommendation presentation application that is configured to present the recommendations to the IoT device user within the virtual computing environment. In other related embodiments of the system, the NFT minting and transfer application is further configured to receive the plurality of NFT templates, wherein the plurality of NFT templates define virtual computing environment events that require associated data to be transmitted to the third-party. In such embodiments of the system, the smart contract is further based upon the virtual computing environment events that require associated data to be transmitted to the third-party. In related embodiments of the system, the second memory of the second computing platform further stores a virtual computing environment listener application that is executable by at least one of the one or more third processing device. The virtual computing environment listener application is configured to use the IoT device identifier to query distributed ledgers of a distributed trust computing network that store the plurality of NFTs to determine the virtual computing environment events that require associated data to be transmitted to the third-party and, in response to determining the virtual computing environment events, listen for the virtual computing environment events and transmit, to the third-party, the data associated with the virtual computing environment events. In such embodiments of the system, the recommendation engine is further configured to, in response to the third-party further receiving the data associated with the virtual computing environment events, receive inputs that further include the data associated with the virtual computing environment events.

A computer-implemented method for third-party acquisition of Internet-of-Things (IoT) device telemetry data and using the IoT device telemetry data to determine IoT device-related recommendations defines second embodiments of the invention. The method is executed by one or more computing processor devices. The method includes receiving a plurality of NFT templates issued from a third-party requesting acquisition of IoT device telemetry data. The plurality of NFT templates define criteria for acquiring IoT device telemetry data. In response to receiving the plurality of NFT templates, the computer-implemented method includes minting a plurality of NFTs. Each NFT (i) corresponds to a NFT template from amongst the plurality of NFT templates, (ii) provides at least one link to an IoT device identifier and an IoT device user identifier and (iii) includes a smart contract, formed between the third-party and an IoT device user, and based upon at least a portion of the criteria for acquiring IoT device telemetry data. In in response to minting the plurality of NFTs, the computer-implemented method includes transferring NFT access rights for accessing each of the NFTs to a corresponding IoT device user and the third-party.

In addition, the computer-implemented method includes using the IoT device identifier to query distributed ledgers of a distributed trust computing network that store the plurality of NFTs to determine the criteria for acquiring IoT device telemetry data, and in response to determining the IoT device the criteria for acquiring IoT device telemetry data, listening for IoT device telemetry data that meets the criteria for acquiring IoT device telemetry data and transmitting, to the third-party, the IoT device telemetry data that meets the criteria.

In response to the third-party receiving the IoT device telemetry data and accessing the NFT to identify the IoT device user, the computer-implemented method further includes receiving, at machine learning models, inputs that include the IoT device telemetry data, identification of an IoT device from which the IoT device telemetry data was acquired and identification of the IoT device user, and, in response to receiving the inputs, determining one or more IoT device-related recommendations that are specific to the IoT device user.

In specific embodiments of the computer-implemented method, receiving further comprises receiving the plurality of NFT templates defining criteria for acquiring IoT device telemetry data, wherein the criteria includes at least one chosen from the group consisting of (i) IoT device events that trigger IoT device telemetry data retrieval and IoT device telemetry data to be retrieved in response to a corresponding IoT device event and (ii) at least one classification of IoT device user.

In other specific embodiments of the computer-implemented method, transmitting the IoT device telemetry data further comprises implementing a bridge protocol to provide real-time transmission of the IoT device telemetry data to the third-party.

In still further specific embodiments of the computer-implemented method, minting further comprises, in response to virtual computing environment interaction between at least two of the third-party, the IoT device user and an IoT device manufacturer or distributor, minting the plurality of NFTs. In such embodiments, the computer-implemented method further includes presenting the recommendations to the IoT device user within the virtual computing environment.

A computer program product including a non-transitory computer-readable medium defines third embodiments of the invention. The computer-readable medium includes a set of codes for causing one or more computing processing devices to receive a plurality of NFT templates issued from a third-party requesting acquisition of IoT device telemetry data. The plurality of NFT templates define criteria for acquiring IoT device telemetry data. In response to receiving the plurality of NFT templates, the computer-readable medium includes a set of codes for causing one or more computing processing devices to mint a plurality of NFTs. Each NFT (i) corresponds to a NFT template from amongst the plurality of NFT templates, (ii) provides at least one link to an IoT device identifier and an IoT device user identifier and (iii) includes a smart contract, formed between the third-party and an IoT device user, and based upon at least a portion of the criteria for acquiring IoT device telemetry data. In response to minting the plurality of NFTs, the computer-readable medium includes a set of codes for causing one or more computing processing devices to transfer NFT access rights for accessing each of the NFTs to a corresponding IoT device user and the third-party.

Further, the computer-readable medium includes a set of codes for causing one or more computing processing devices to use the IoT device identifier to query distributed ledgers of a distributed trust computing network that store the plurality of NFTs to determine the criteria for acquiring IoT device telemetry data, and, in response to determining the IoT device the criteria for acquiring IoT device telemetry data, listen for IoT device telemetry data that meets the criteria for acquiring IoT device telemetry data and transmit, to the third-party, the IoT device telemetry data that meets the criteria.

In response to the third-party receiving the IoT device telemetry data and accessing the NFT to identify the IoT device user, the computer-readable medium includes a set of codes for causing one or more computing processing devices to receive, at machine learning models, inputs that include the IoT device telemetry data, identification of an IoT device from which the IoT device telemetry data was acquired and identification of the IoT device user, and, in response to receiving the inputs, determine one or more IoT device-related recommendations that are specific to the IoT device user.

In specific embodiments of the computer program product, the set of codes for causing one or more computing processing devices to receive a plurality of NFT templates further cause the one or more computing processor devices to receive a plurality of NFT templates issued from the third-party requesting acquisition of IoT device telemetry data, wherein the plurality of NFT templates define criteria for acquiring IoT device telemetry data, wherein the criteria includes at least one chosen from the group consisting of (i) IoT device events that trigger IoT device telemetry data retrieval and IoT device telemetry data to be retrieved in response to a corresponding IoT device event and (ii) at least one classification of IoT device user.

In still further specific embodiments of the computer program product, the set of codes for causing one or more computing processing devices to transmit the IoT device telemetry data further cause the one or more computing processor devices to implement a bridge protocol to provide real-time transmission of the IoT device telemetry data to the third-party.

Thus, according to embodiments of the invention, which will be discussed in greater detail below, the present invention provides provide for real-time transmission of IoT telemetry data to a third-party and use of such data by the third-party for purposes of determining IoT device-related recommendations specific to the IoT device user. The invention relies on machine learning models which receive, as a least a part of the inputs, the IoT telemetry data, to determine recommendations that are tied to the IoT device and specific to the IoT device user. Non Fungible Tokens (NFTs) are relied upon that are minted by the IoT device manufacturer/distributor and hold a link to an IoT device identifier and an IoT device user identifier and include a smart contract formed between the third-party and the IoT device user that defines the criteria for the telemetry data that is to be acquired by the third-party. Use of the NFT allows for IoT gateways/data listeners to determine which IoT telemetry data is to be transmitted to the third-party and allows for the transmission to occur without identifying the IoT user in the transmissions.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
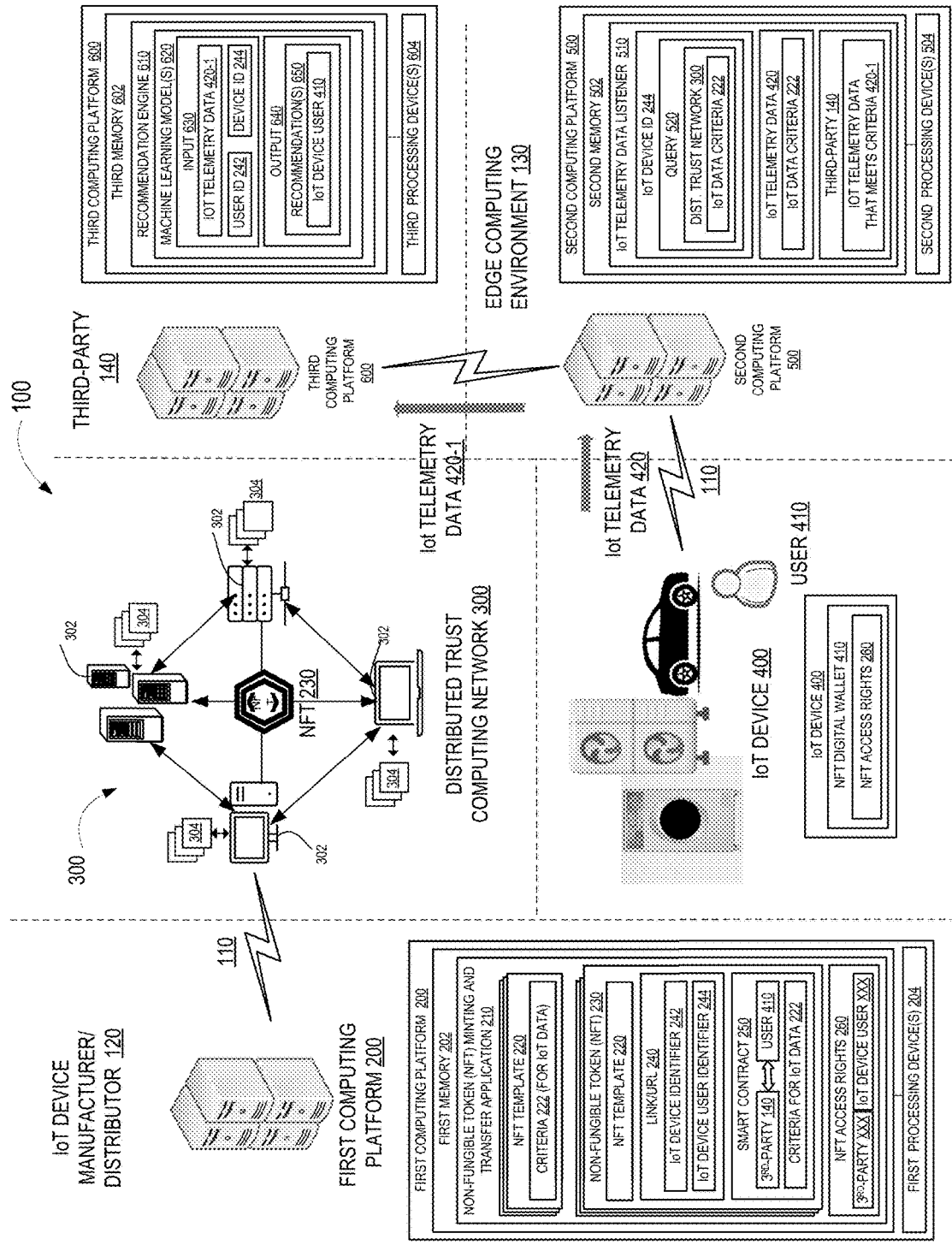
Figure 2:
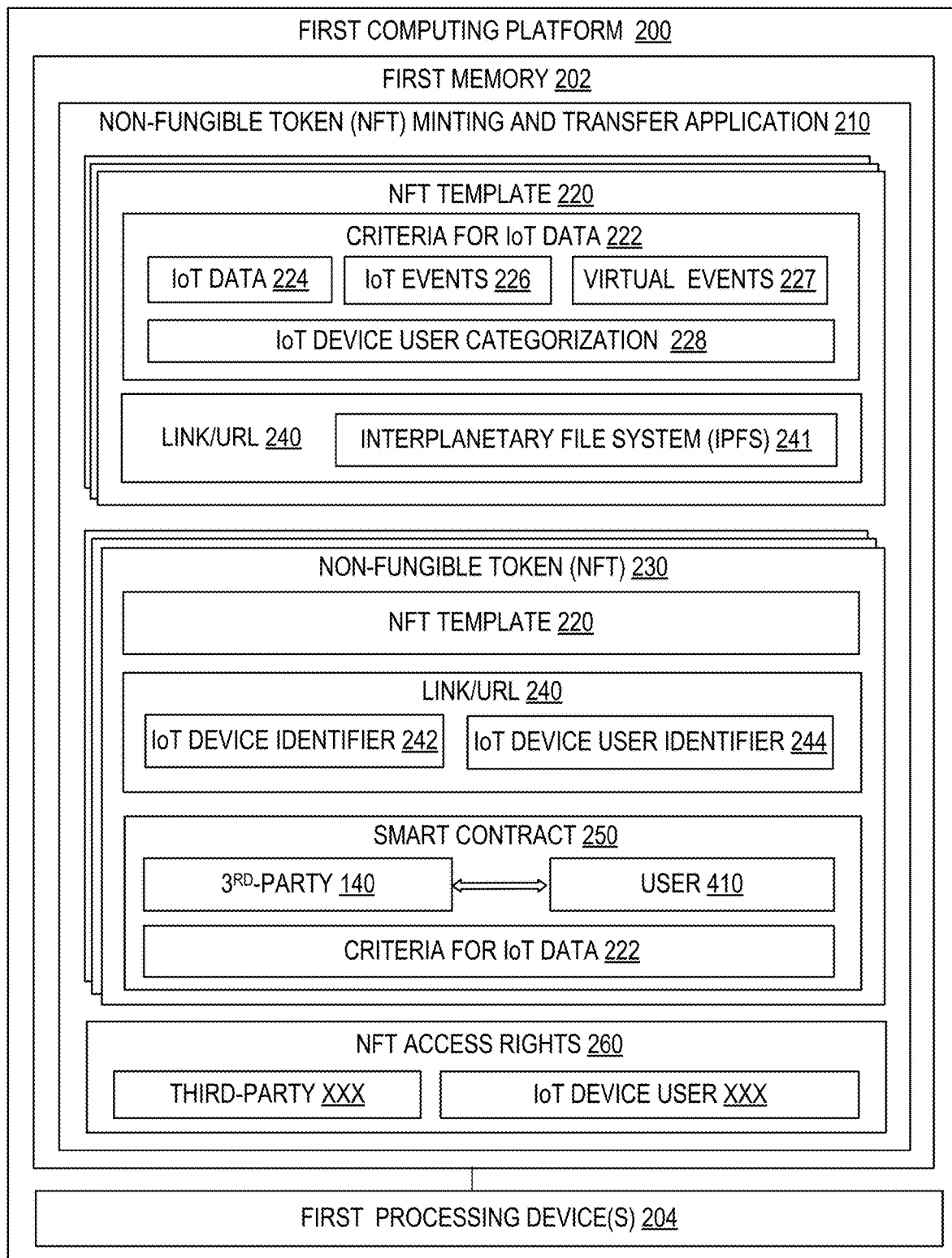
Figure 3:
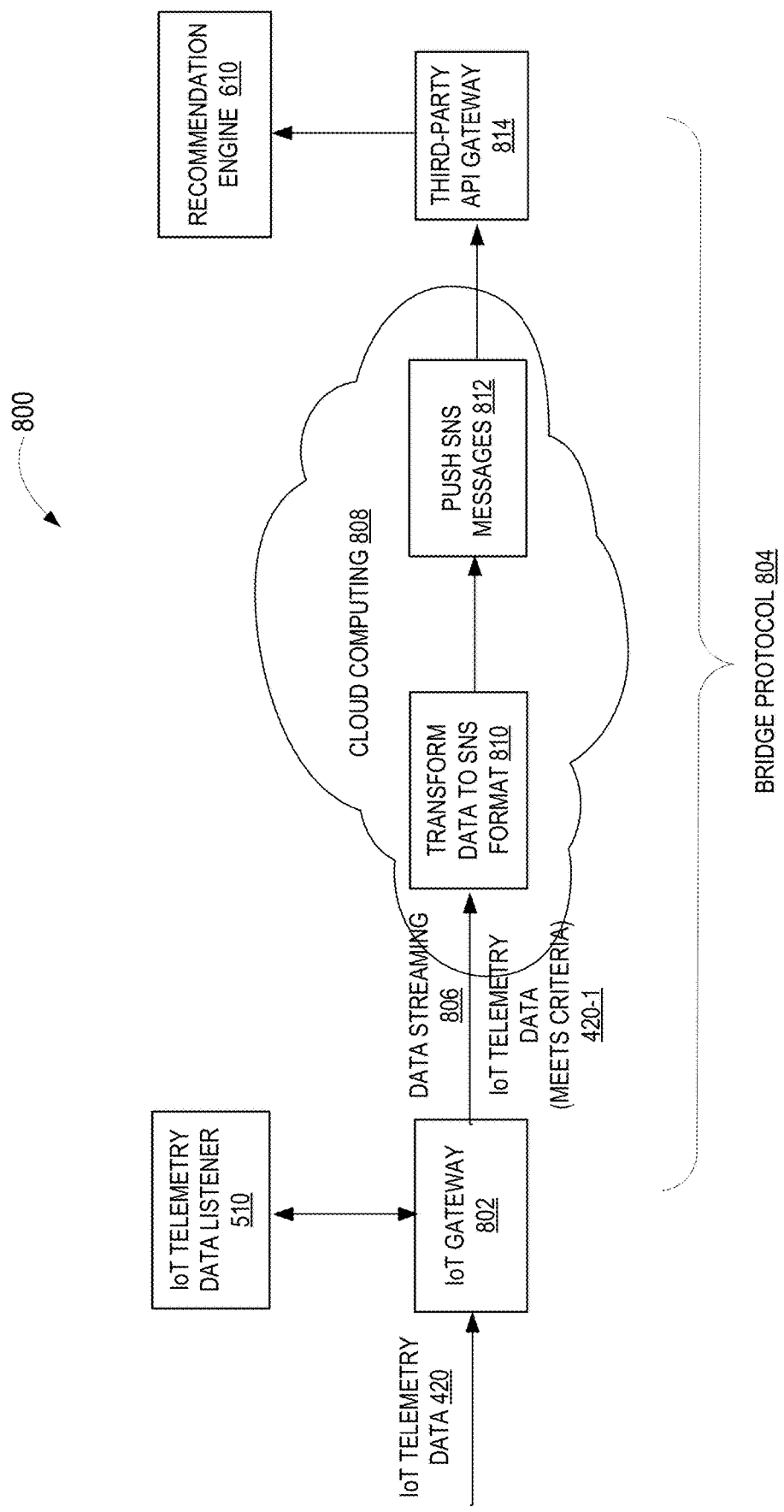
Figure 4:
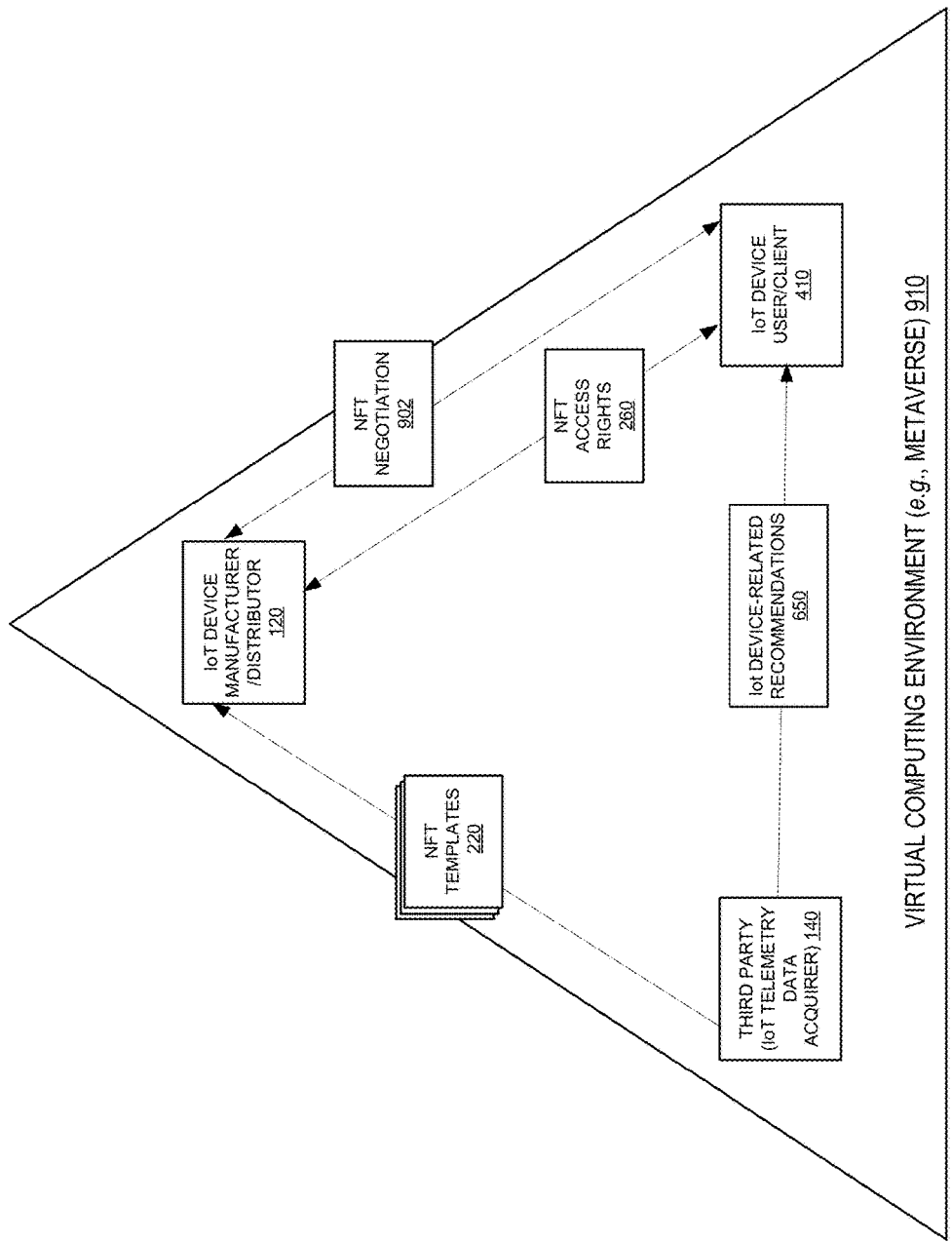
Figure 5:
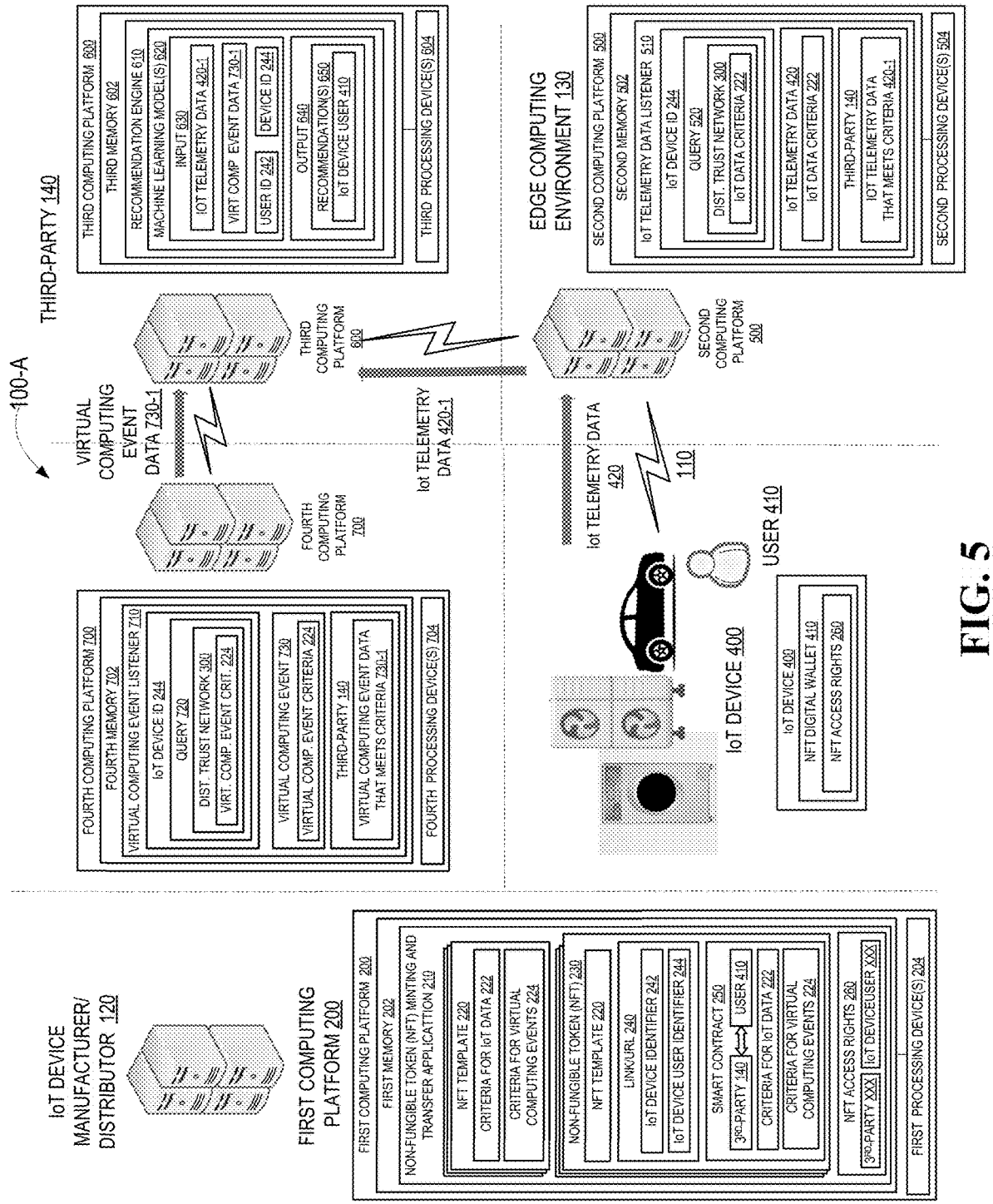
Figure 6:
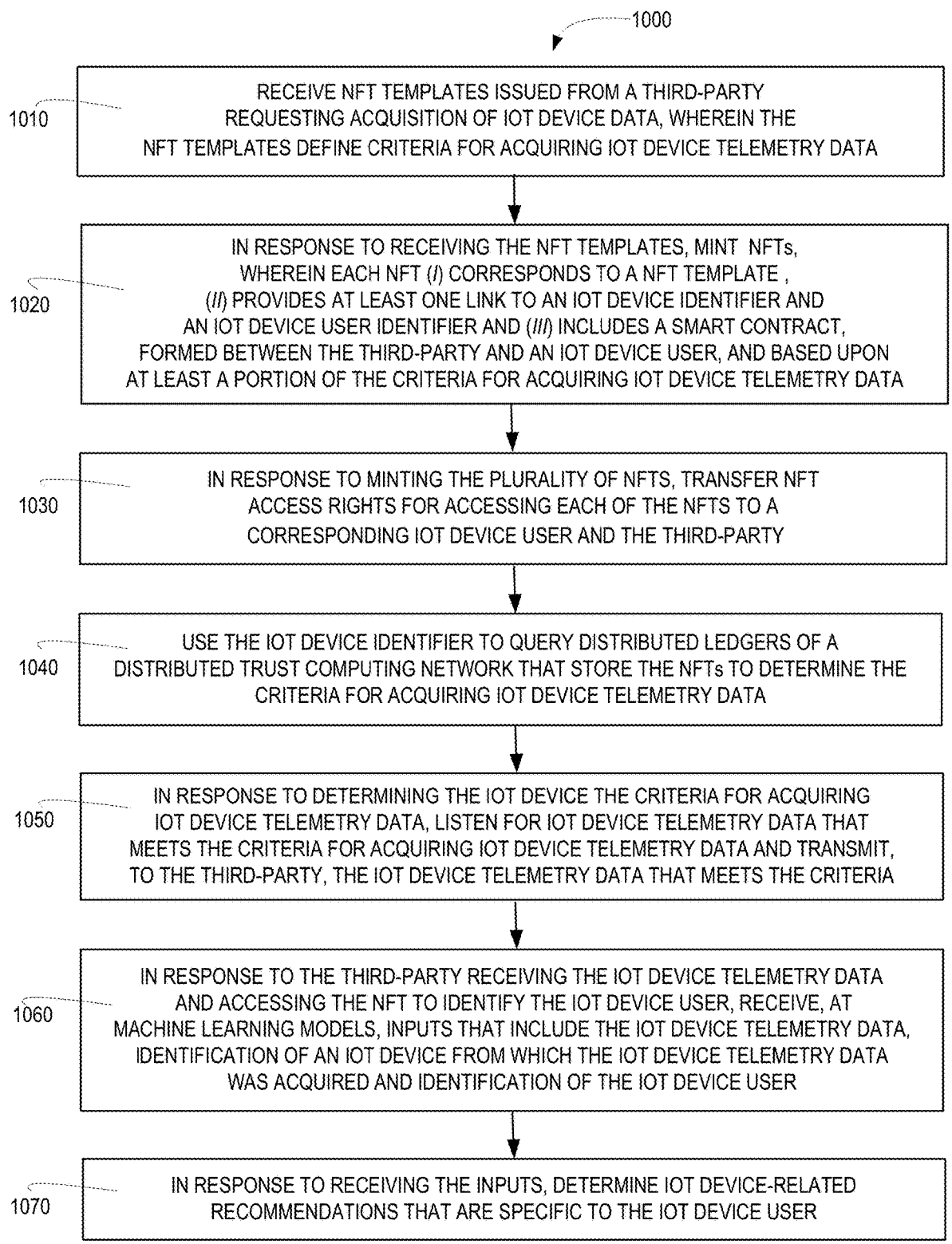
Figure 7:
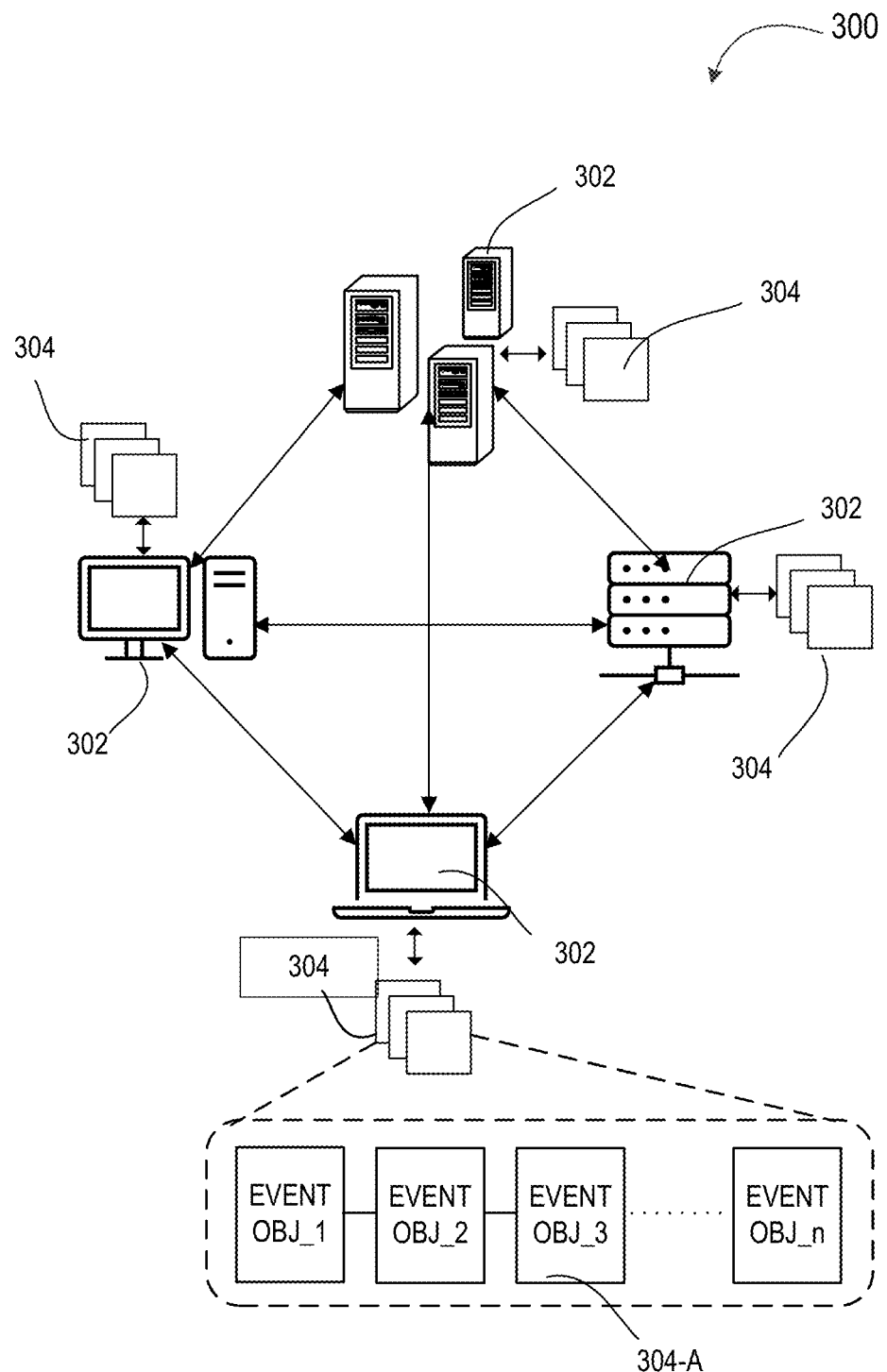
Figure 8:
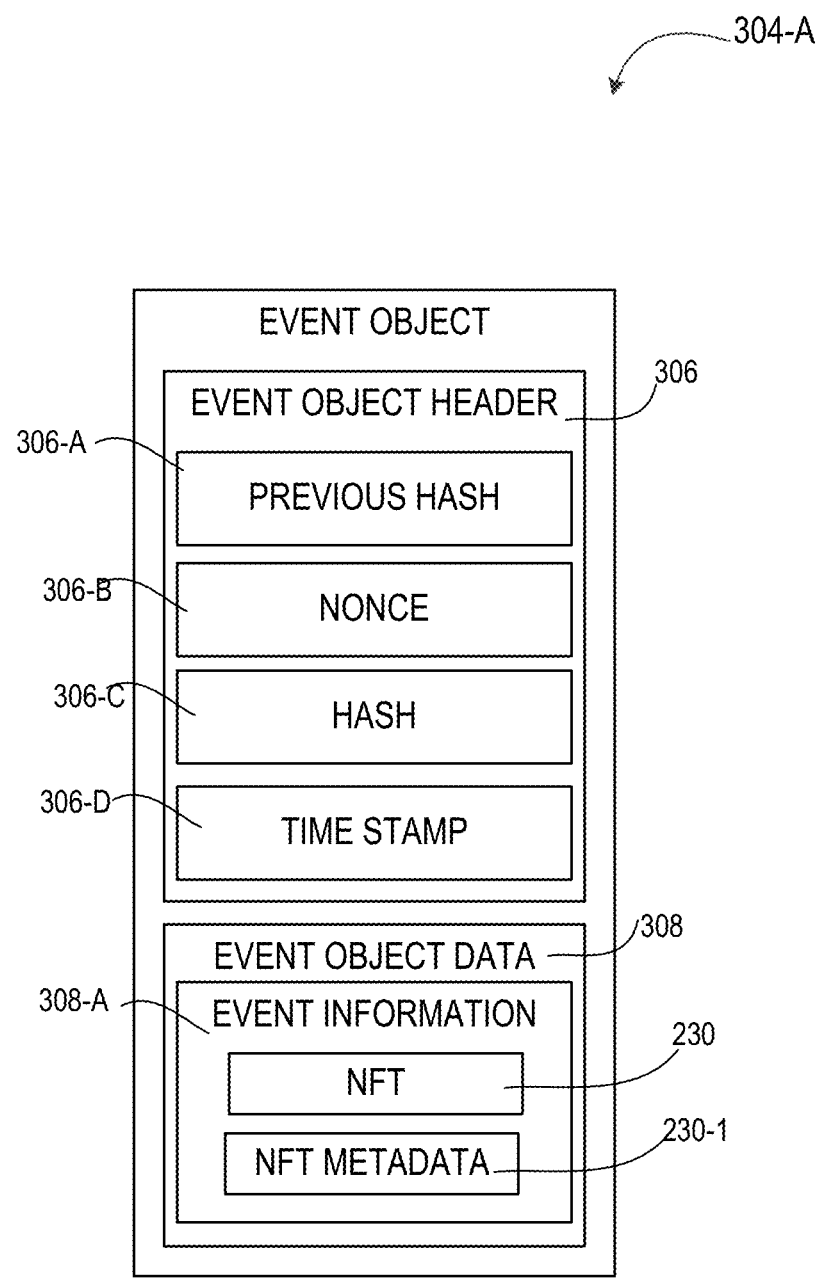
Figure 9:
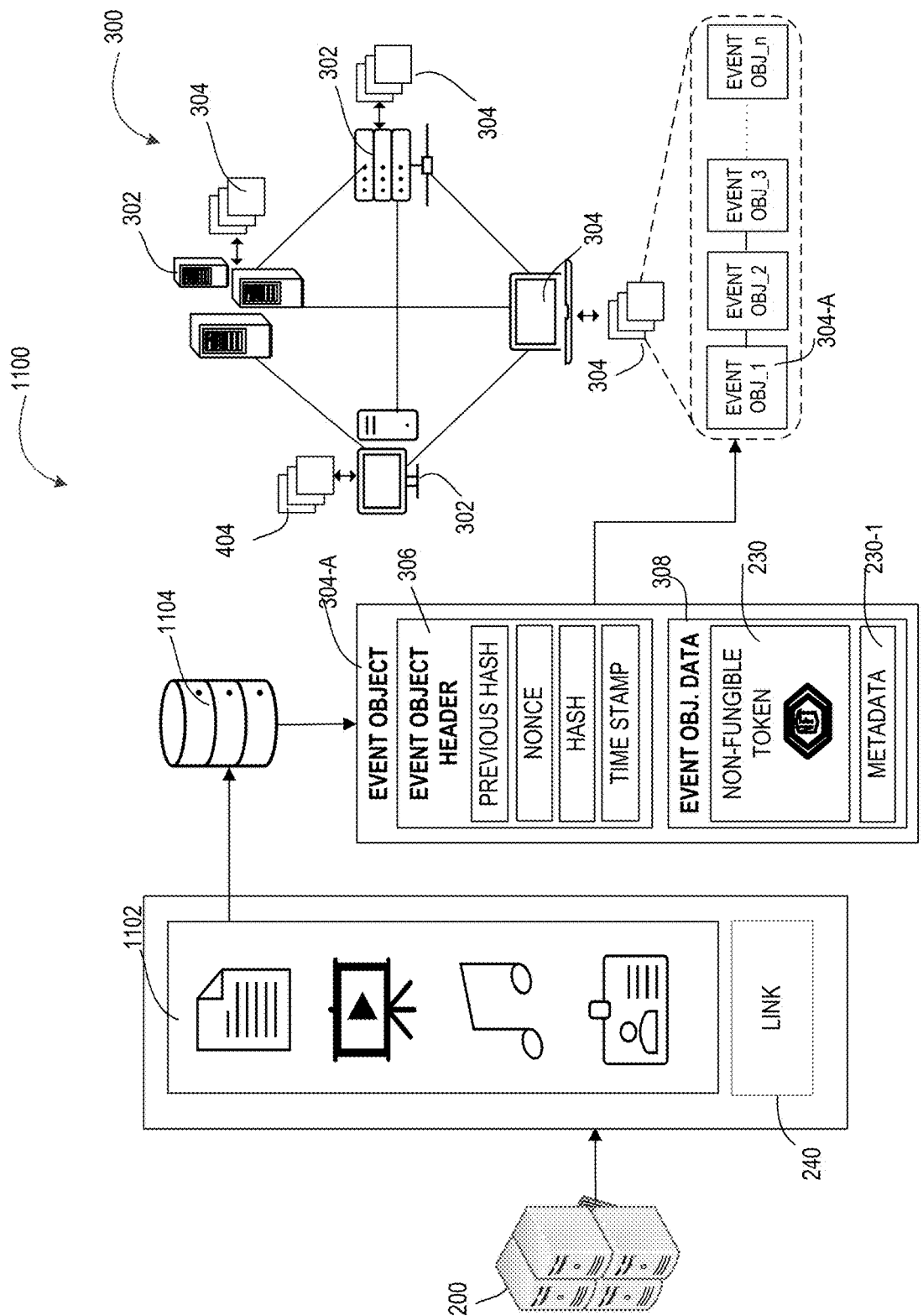
Figure 10:
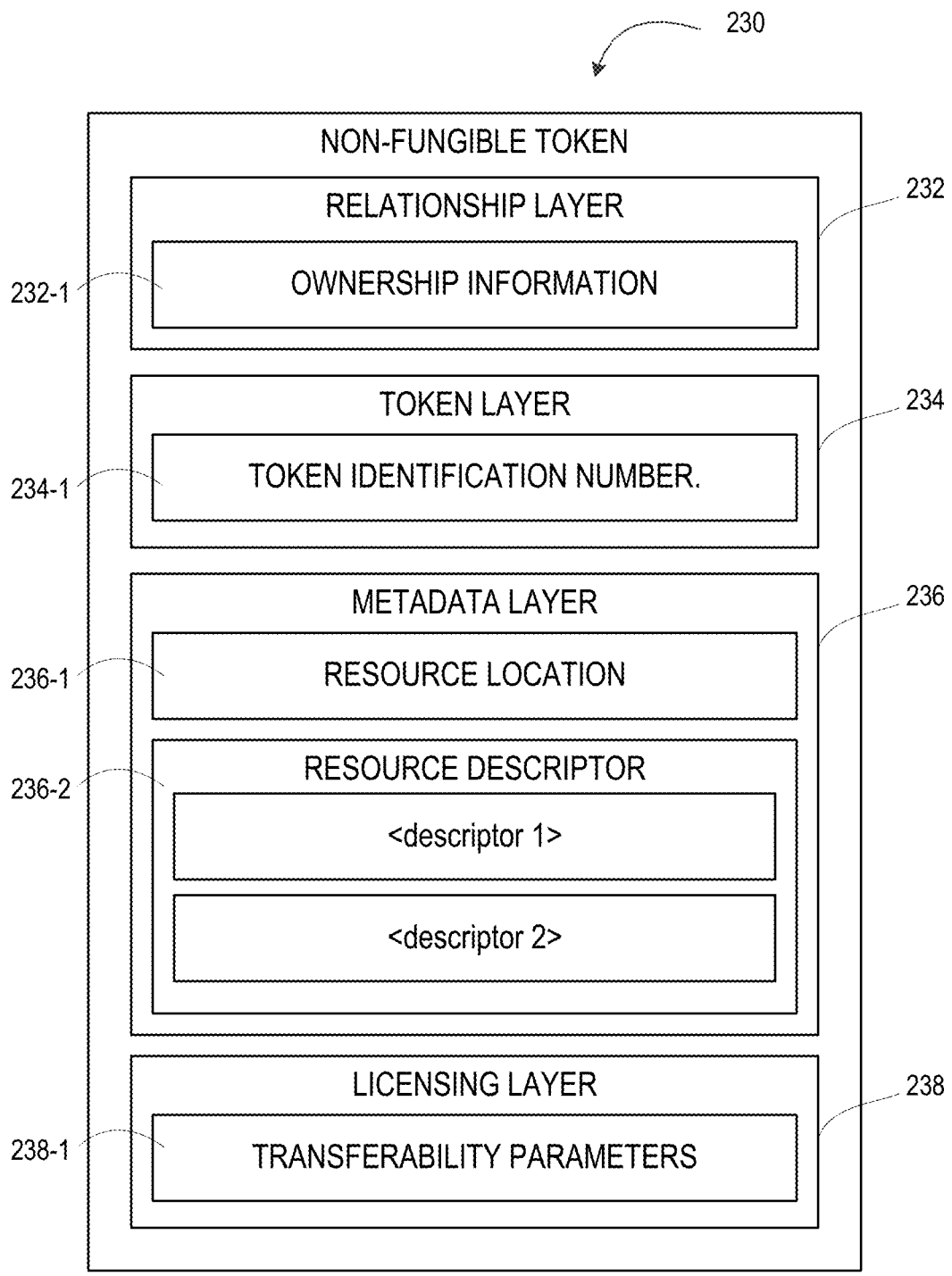

Having thus described embodiments of the disclosure in general terms, reference will now be made to the accompanying drawings, wherein:

FIG. 1 is a schematic/block diagram of a system for third-party acquisition of IoT telemetry data and using the data to determine Internet of Things (IoT) device-related recommendation that are specific to a user, in accordance with embodiments of the present invention;

FIG. 2 is block diagram of a computing platform having a Non Fungible Token (NFT) minting and transfer application, in accordance with embodiments of the present invention;

FIG. 3 is schematic/flow diagram highlighting bridge protocol-enabled transmission of IoT telemetry data from an IoT gateway to a third-party Application Programing Interface (API) gateway, in accordance with embodiments of the present invention;

FIG. 4 is a schematic/flow diagram of highlighting various functions of the invention being implemented in a virtual computing environment, in accordance with embodiments of the present;

FIG. 5 is a schematic/block diagram of a system for third-party acquisition of IoT telemetry data and virtual computing-related event data and using the data to determine Internet of Things (IoT) device-related recommendation that are specific to a user, in accordance with embodiments of the present invention;

FIG. 6 is a flow diagram of a method for third-party acquisition of IoT telemetry data and using the data to determine Internet of Things (IoT) device-related recommendation that are specific to a user, in accordance with embodiments of the present invention;

FIG. 7 is a schematic diagram of a distributed trust computing network, in accordance with embodiments of the present invention;

FIG. 8 is a block diagram of an event object stored within a distributed ledger of a distributed trust computing network, in accordance with some embodiments of the present disclosure;

FIG. 9 is a schematic diagram of system for generating a Non-Fungible Token (NFT) and storing the NFT within a distributed trust computing network, in accordance with embodiments of the present invention; and FIG. 10 is a block diagram of an architecture for an exemplary NFT; in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as a system, a method, a computer program product, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted, or unscripted programming language such as JAVA, PERL, SMALLTALK, C++, PYTHON, or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or systems. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform or "configured for" performing a certain function in a variety of ways, including, for example, by having one or more general-purpose circuits perform the function by executing particular computer-executable program code embodied in computer-readable medium, and/or by having one or more application-specific circuits perform the function.

Thus, according to embodiments of the invention, which will be described in more detail below, systems, methods and computer program products are disclosed that providing a unique means for real-time transmission of IoT telemetry data to a third-party and use of such data by the third-party for purposes of determining IoT device-related recommendations specific to the IoT device user. The invention relies on machine learning models which receive the IoT telemetry data, as a least a part of the inputs, to determine recommendations that are tied to the IoT device and specific to the IoT device user.

In particular the invention relies on Non Fungible Tokens (NFTs) that are minted by the IoT device manufacturer/distributor and hold a link to an IoT device identifier and an IoT device user identifier and include a smart contract formed between the third-party and the IoT device user that defines the criteria for the telemetry data that is to be acquired by the third-party. Use of the NFT allows for IoT gateways/data listeners to determine which IoT telemetry data is to be transmitted to the third-party and allows for the transmission to occur without identifying the IoT user in the transmissions.

In specific embodiments of the invention, real-time transmission of the IoT telemetry data from the IoT gateway to the third-party is realized by implementing a bridge protocol and streaming IoT telemetry data to a cloud computing platform, at which the data is transformed to a Simple Notification System (SNS) format and SNS messages including the telemetry data are pushed to a third-party-side Application Programming Interface (API).

In other specific embodiments of the invention, various features of the invention are executed in a virtual computing environment, such as the Metaverse or the like or result from interactions between the third-party, the IoT device user and the IoT device manufacturer within the virtual computing environment. For example, NFT templates may be issued by the third-party to the IoT device manufacturer, NFT access rights may transferred from the IoT device manufacturer (i.e., NFT minter) to the IoT device user and/or the recommendations may be presented to the IoT device user via the virtual computing environment.

Referring to FIG. 1, a schematic/block diagram is provided of a system 100 for third-party acquisition of IoT telemetry data and using the data to determine Internet of Things (IoT) device-related recommendation that are specific to a user, in accordance with embodiments of the present invention. An IoT device 400, as used herein, is any hardware device equipped with one more sensors and capable of connecting and exchanging data captured by the sensors with other devices and systems over the Internet or other communication networks. The system 100 is executable throughout distributed communications network 110, which may comprise the Internet, one or more intranets, one or more cellular communication networks or the like.

The system 100 includes a first computing platform 200, which in specific embodiments of the invention, as shown, is in control on an IoT device manufacturer or distributor 120. First computing device 200 includes a first memory 202 and one or more first processing devices 204 in communication with the first memory 202. First memory 202 stores Non-Fungible Token (NFT) minting and transfer application 210 that is executable by at least one of the first processing device(s) 204. An NFT as used herein refers to any cryptographic token which is non-fungible (i.e., unique and not commercially interchangeable). While conventional NFTs typically represent a digital or real-world item, such as artwork, music or video or the like, the NFTs of the present invention are not required to represent such a digital or real-world item.

NFT minting and transfer application 210 is configured to receive plurality of NFT templates 220 that have been issued from a third-party requesting acquisition IoT telemetry data. The NFT templates 220 define criteria 222 for acquiring IoT telemetry data. In response to receiving the NFT templates 220, NFT minting and transfer application 210 is configured to mint, for example, in a white-label NFT marketplace, a plurality of NFTs 230 with each of the NFTs 230 corresponding to one of the plurality of NFT templates 220. The NFTs 230 provides for cryptographic inclusion of at least one link 240, such as a Universal Resource Locator (URL) tied to a storage location for an IoT device identifier 242 (i.e., the IoT device 400 from which data is to be acquired) and an IoT device user identifier 244 (i.e., the user 410 (possessor/owner) of the IoT device 400). Moreover, the NFTs 230 include a smart contract 250 which is formed between the third-party 140 acquiring the IoT telemetry data and the IoT device user 410 and is based upon at least a portion of the criteria 222 for acquiring the IoT device telemetry data. In this regard, the IoT device user 410 will have previously acquiesced in the third-party 140 acquiring and using IoT telemetry data from the IoT device 400. The process by which the IoT device user 410 acquiesces may be conducted directly between the third-party 140 and the IoT device user 410 or indirectly between the IoT device manufacturer/distributor 120 (on behalf of the third-party 140) and the IoT device user 410.

In response to minting the NFTs, NFT minting and transfer application 210 is further configured to deliver the NFTs 230 to a distributed ledger 304 held by the various nodes 302 of a distributed trust computing network 300 and transfer NFT access rights 260 to the corresponding IoT device user 410 and third-party 140. In specific embodiments of the invention, transfer of the NFT access rights 260 to the IoT device user includes transferring the NFT access rights to a NFT digital wallet 410 in the IoT device 400 itself.

The system 100 additionally includes a second computing platform 500, which in specific embodiments of the invention, as shown, is located within an edge computing environment 130. Second computing device 500 includes a second memory 502 and one or more second processing devices 504 in communication with the second memory 502. Second memory 502 stores IoT telemetry data listener 510 that is executable by at least one of the first processing device(s) 504. IT telemetry data listener 510 is configured to use the IoT device identifier to query the distributed ledger(s) 304 of the distributed trust computing networks 300 that store the NFTs 230 to determine the criteria 222 for acquiring IoT telemetry data. In response to determining the criteria 222, IoT telemetry data listener 510 is configured to listen for IoT telemetry data 420-1 that meets the criteria 222 and transit the IoT telemetry data 420-1 that meets the criteria 222 to the third-party 140. In this regard, not all of the IoT telemetry data 420 emitted from the IoT device 400 is captured/transmitted to the third-party 140, but only that portion of the IoT telemetry data 420-1 that meets the predefined criteria 222 specified in the NFT's smart contract 250 is captured/transmitted to the third-party 140.

The system 100 additionally includes a third computing platform 600, which in specific embodiments of the invention, as shown, is in control on a third-party 120, i.e., an entity other than the IoT device manufacturer/distributor 120, such as, in specific embodiments of the invention, a financial institution. Third computing device 600 includes a third memory 602 and one or more third processing devices 604 in communication with the third memory 602. Third memory 602 stores recommendation engine 610 that includes one or more machine-learning (ML) models 620. Recommendation engine 610 is executable by at least one of the first processing device(s) 604.

In response to the third-party receiving the IoT device telemetry data 420-1 and accessing the NFT 230 to identify the IoT device user 410, the ML models are configured to receive inputs 630 that include, but are not limited to, the IoT telemetry data 420-1, user identifier 242 or so other identification of the IoT device user 410 and IoT device identifier 244 or some other identification of the IoT device 400. In response to receiving the inputs 630 and executing the ML models 620, the recommendation engine 610 is configured to output/determine one or more IoT device-related recommendations 650 that are specific to the IoT device user 410. In specific embodiments of the invention in which the third-party is a financial institution and IoT device user is a customer or prospective customer, the recommendations(s) 650 may be offers for financial products or services, such as offers for loans, credit vehicles, or the like.

Referring to FIG. 2, a block diagram is depicted of a first computing platform 200, in accordance with embodiments of the present invention. In addition to highlighting various alternative embodiments of the invention, first computing platform 200 shown in FIG. 2 provides greater details. First computing platform 200 and other computing platforms discussed herein may comprise one or multiple devices, such as application servers, or the like.

First computing platform 200 includes first memory 202, which may comprise volatile and/or non-volatile memory, such as read-only and/or random-access memory (RAM and ROM), EPROM, EEPROM, flash cards, or any memory common to computing platforms). Moreover, first memory 202 may comprise cloud storage, such as provided by a cloud storage service and/or a cloud connection service. The details of first memory 202 are consistent with the details of other memories discussed herein, such second memory 502, third memory 602 and subsequently discussed fourth memory 702 (see, FIG. 5).

Further, first computing platform 200 includes one or more first processing devices 204, which may be an application-specific integrated circuit ("ASIC"), or other chipset, logic circuit, or other data processing device. First processing device(s) 204 may execute one or more application programming interface (APIs) 206 that interface with any resident programs, such as NFT minting and transfer application 210 or the like, stored in first memory 202 of first computing platform 200 and any external programs. First processing devices(s) 204 may include various processing subsystems (not shown in FIG. 2) embodied in hardware, firmware, software, and combinations thereof, that enable the functionality of first computing platform 200 and the operability of first computing platform 200 on a distributed communication network 110 (shown in FIG. 1), such as the Internet, intranet(s), cellular network(s), and the like. For example, processing subsystems allow for initiating and maintaining communications and exchanging data with other networked devices. For the disclosed aspects, processing subsystems of first computing platform 200 may include any subsystem used in conjunction with NFT minting and transfer application 210 and related tools, routines, sub-routines, algorithms, sub-algorithms, sub-modules thereof. The details of first processing device 204 are consistent with the details of other processing devices discussed herein, such second processing device(s) 504, third processing device(s) 604 and subsequently discussed fourth processing device(s) 704 (see, FIG. 5).

In specific embodiments of the present invention, first computing platform 200 additionally includes a communications module (not shown in FIG. 2) embodied in hardware, firmware, software, and combinations thereof, that enables electronic communications between first computing platform 200 and other networks and network devices. Thus, communication module may include the requisite hardware, firmware, software and/or combinations thereof for establishing and maintaining a network communication connection with one or more devices and/or networks. Additionally, other computing platforms discussed herein will additionally include a communications module.

As previously discussed in relation to FIG. 1, first memory 202 of first computing platform 200 stores NFT minting and transfer application 210, which is executable by one or more of the first processing devices 204. NFT minting and transfer application 210 is configured to receive plurality of NFT templates 220 that have been issued from a third-party requesting acquisition IoT telemetry data. The NFT templates 220 define criteria 222 for acquiring IoT telemetry data. The criteria 222 may include specific IoT telemetry data 224 and IoT telemetry events 226 that trigger the collection of IoT telemetry data 224. In those embodiments of the invention, in which the third-party 140, IoT device manufacturer/distributor 120 and/or IoT device user 410 interact within a virtual computing environment (such as described in relation to FIG. 4), criteria 222 may further include virtual data/events 227. Moreover, criteria 222 may include IoT device user categorization 228 which defines characteristics of the users, such as status, geographic location or the like, which the third-party 140 desires to acquire IoT telemetry data from.

In addition, NFT templates 220 may include one or more links, such as URLs that are associated with storage locations, such as Interplanetary File System (IPFS) storage locations or the like. It should be noted that the links/URLs provide in an NFT template 220 will not link to IoT device identifiers 242 or IoT device user identifiers 244 as these identifiers will be inputted/provided by the IoT manufacturers/distributors prior to (or in some instances after) minting the NFTs 230.

In response to receiving the NFT templates 220, NFT minting and transfer application 210 is configured to mint, for example, in a white-label NFT marketplace, a plurality of NFTs 230 with each of the NFTs 230 corresponding to one of the plurality of NFT templates 220. The NFTs 230 provides for cryptographic inclusion of at least one link 240, such as a Universal Resource Locator (URL) tied to a storage location for an IoT device identifier 242 (i.e., the IoT device 400 from which data is to be acquired) and an IoT device user identifier 244 (i.e., the user 410 (possessor/owner) of the IoT device 400). As previously discussed the link/URL 240 may be provided as part of the NFT template 220.

Moreover, the NFTs 230 include a smart contract 250 which is formed between the third-party 140 acquiring the IoT telemetry data and the IoT device user 410 and is based upon at least a portion of the criteria 222 for acquiring the IoT device telemetry data. For example, the criteria 22 may include, but is not limited to, IoT telemetry data 224, IoT telemetry events 226 that trigger collection of IoT telemetry data, virtual computing events/data 227 and/or IoT device user categorization.

In response to minting the NFTs, NFT minting and transfer application 210 is further configured to deliver the NFTs 230 to a distributed ledger 304 held by the various nodes 302 of a distributed trust computing network 300 and transfer NFT access rights 260 to the corresponding IoT device user 410 and third-party 140. In specific embodiments of the invention, transfer of the NFT access rights 260 to the IoT device user includes transferring the NFT access rights to a NFT digital wallet 410 in the IoT device 400 itself.

Referring to FIG. 3, a schematic/flow diagram is depicted of a method for real-time transmission of IoT telemetry data from an IoT gateway to a third-party, in accordance with embodiments of the present invention. IoT telemetry data 420 is received by IoT gateway 802, which is deployed in an edge computing environment. IoT telemetry data listener 510 is invoked to determine IoT telemetry data 420-1 that meets the criteria for third-party acquisition. Specifics regarding the process by which IoT telemetry data listener 510 determines IoT telemetry data 420-1 that meets the criteria was previously discussed in relation to FIG. 1.

Once IoT telemetry data 420-1 meeting the criteria has been determined data a bridge protocol 804, such as BRIDGE® Oracle protocol (available from the Oracle Corporation of Austin, Texas) is used and data streaming 806 is implemented to transmit IoT telemetry data 420-1 to cloud computing environment 806. Use of a bridge protocol is instrumental in providing real-time data transmission from the IoT gateway 802 to the third-party. Subsequently, the data stream is transformed to Simple Notification System (SNS) format 810 and SNS messages 812 are pushed to a third-party Application Programming Interface 814. API gateway 814 transmits the SNS messages 812 directly to recommendation engine 610 or, alternatively, SNS messages 814 are transmitted to storage (not shown in FIG. 3) prior to input into recommendation engine 610.

FIGS. 4 and 5 highlight those embodiments of the invention, in which various aspects of the invention occur within a virtual computing environment, such as the Metaverse or the like. Referring to FIG. 4, a schematic/flow diagram is depicted of a virtual computing environment 900 in which the third-party 140, IoT device manufacturer/distributor 120 and IoT device user/client 410 interact virtually though the use of avatars and virtual marketplaces. In specific embodiments of the invention, IoT manufacturer/distributor 120 conducts NFT negotiations 902 with the IoT device user 410 via the virtual computing environment 900. NFT negotiations 902 may be part of the offer presented to the IoT device user 410 at the time of IoT device 400 sale (which occurs within the virtual computing environment 900) and may include cost offsets or the like for allowing the third-party to acquire IoT telemetry data. In alternate embodiments of the invention, NFT negotiations 902 may occur, within the virtual computing environment 900 after the IoT device user 410 has acquired the IoT device 400. In further embodiments of the invention (not depicted in FIG. 4) NFT negotiations may occur directly, within the virtual computing environment, between the third-party 140 and the IoT device user 410.

In further specific embodiments of the invention the NFT templates 220 are transmitted from the third-party 140 to the IoT device manufacturer/distributor 120 via the virtual computing environment and/or as a result of virtual computing environment interaction between the third-party 140 and the IoT device manufacturer/distributor 120. Similarly, NFT access rights 260 may be transmitted from the IoT device manufacturer/distributor (i.e., the entity minting the NFT 230) via the virtual computing environment and/or as a result of virtual computing environment interaction between the IoT device user 410 and the IoT device manufacturer/distributor 120.

In response to determination of IoT-device related recommendations 650, specific embodiments of the invention provide for the IoT device-related recommendations to be presented by the third-party to the IoT device user 410 (or in some embodiments, not shown in FIG. 3, indirectly by the IoT device manufacturer/distributor 120 to the IoT device user 410). Referring to FIG. 5, a schematic diagram is depicted of a system 100-A for third-party acquisition of IoT telemetry data and virtual computing event data and using the data to determine Internet of Things (IoT) device-related recommendation that are specific to a user, in accordance with embodiments of the present invention. The system 100-A is similar to the system 100 shown in FIG. 1 (although due to space limitations the distributed trust computing network 300 has been omitted from FIG. 5) and therefore, for the sake of brevity, only the features that are in addition to those described in relation to FIG. 1 will be discussed herein.

System 100-A is applicable to those embodiments of the invention in which a virtual computing network 900 is implemented for purposes of NFT 230 deployment, access right transfer and/or recommendation presentation. In specific embodiments of the invention, NFT template 220 further includes criteria 224 for acquiring virtual computing event-related data. In this regard, the criteria 224 may define the virtual computing events and/or the data associated with the virtual computing events requested by third-party 140.

System 100-A further includes fourth computing platform 700 that includes a fourth memory 702 and one or more fourth processing devices 704 in communication with the fourth memory 702. Fourth memory 702 stores virtual computing event listener 710 that is executable by at least one of the fourth processing device(s) 704. IoT telemetry data listener 510 is configured to use the IoT device identifier to query the distributed ledger(s) 304 of the distributed trust computing networks 300 that store the NFTs 230 to determine the criteria 224 for acquiring virtual computing event data. In response to determining the criteria 224, virtual computing event listener 710 is configured to listen for virtual computing event 730 that meets the criteria 224 and transit the virtual computing event data 730-1 that meets the criteria 224 to the third-party 140.

Moreover, recommendation engine 620 is further configured to receive the virtual computing event data 730-1 as further inputs to the machine learning models 620 and, thus, determine the recommendations 650 based further on the virtual computing event data 730-1

Referring to FIG. 6, a flow diagram is presented of a method 1000 for third-party acquisition of IoT telemetry data and using the data to determine Internet of Things (IoT) device-related recommendation that are specific to a user, in accordance with embodiments of the present invention. At Event 1010, NFT templates are received that have been issued from a third-party requesting acquisition of IoT telemetry data. The NFT templates define criteria for acquiring IoT telemetry data, which may include, but is not limited to, the IoT events that trigger data, IoT telemetry data and user categorization (i.e., the type if IoT device users who should be issued NFTs). In response to receiving the NFT templates, at Event 1020, NFTs are minted with each NFT corresponding to one of the NFT templates. The NFTs cryptographically hold a link, such as a URL that is tied to a storage location for storing an IoT device identifier (e.g., serial number or the like) and IoT device user identifier (e.g., third-party account number or the like). Additionally, the NFTs include a smart contract formed between the third-party and IoT device user that is based on at least a portion of the criteria for acquiring IoT telemetry data. In response to minting the NFTs, at Event 1030, the access rights NFTs (i.e., private keys or the like) are transferred to the IoT device user and the third-party.

At Event 1040, an IoT event listener uses the IoT device identifier to query the distributed ledger of a distributed trust computing network that stores the NFTs to determine the criteria for acquiring IoT telemetry data. In response to determining the criteria, at Event 1050, the IoT event listener, listens for IoT device events and transmits, to the third-party, IoT telemetry data associated with the IoT device events that meet the criteria. In specific embodiments of the method, the data is transmitted in real-time using a bridge protocol, which stream the data a cloud computing environment that is responsible for transforming the data to SNS format and pushing SNS messages containing the data to a third-party API interface.

In response to the third-party receiving the IoT device telemetry data and identifying the IoT device user (e.g., accessing the NFT to access the link held therein). At Event 1060, machine learning models receive inputs including, but not limited to, the IoT device telemetry data, and identification of the IoT device user and the IoT device associated with the data. In response to receiving the inputs and executing the machine learning models, at Event 1070, IoT device-related recommendations (e.g., offers for products or services provided by the third party, such as offers for loan products provided by financial institutions) specific to the IoT device user are determined and, subsequently presented to the IoT device user.

Referring to FIGS. 7 and 8, schematic/block diagram illustrate an exemplary distributed ledger technology (DLT) architecture implemented in a distributed trust computing network (commonly referred to as a "blockchain" network), in accordance with embodiments of the invention. DLT may refer to the protocols and supporting infrastructure that allow computing devices (peers) in different locations to propose and validate events and update records in a synchronized way across a network. Accordingly, DLT is based on a decentralized model, in which these peers collaborate and build trust over the network. To this end, DLT involves the use of potentially peer-to-peer protocol for a cryptographically secured distributed ledger of events represented as event objects that are linked. As event objects each include information about the event object before it, they are linked with each additional event object, reinforcing the previously ones stored prior. Therefore, distributed ledgers are resistant to modification of their data because once recorded, the data in any given event object cannot be altered retroactively without altering all subsequent event objects.

To permit events and agreements to be carried out among various peers without the need for a central authority or external enforcement mechanism, DLT uses smart contracts. Smart contracts are computer code that automatically executes all or parts of an agreement and is stored on a DLT platform. The code can either be the sole manifestation of the agreement between the parties or may complement a traditional text-based contract and execute certain provisions, such as conducting an event between Party A to Party B. The computer code of the smart contract itself is replicated across multiple nodes (peers) and, therefore, benefits from the security, permanence, and immutability that a distributed ledger offers. That replication also means that as each new event object is added to the distributed ledger, the code is, in effect, executed. If the parties have indicated, by initiating an event, that certain parameters have been met, the code will execute the step triggered by those parameters. If no such event has been initiated, the code will not take any steps.

Various other specific-purpose implementations of distributed ledgers have been developed. These include distributed domain name management, decentralized crowd-funding, synchronous/asynchronous communication, decentralized real-time ride sharing and even a general-purpose deployment of decentralized applications. A distributed ledger may be characterized as a public distributed ledger, a consortium distributed ledger, or as is the case in the present invention, a private (i.e., non-public and/or proprietary) distributed ledger. A public distributed ledger is a distributed ledger that any entity can access, communicate events to and expect to see them stored thereon if they nodes of the distributed trust computing network come to a consensus and find the events to be valid. Further, any entity can participate in the consensus process for determining which event objects are valid and, therefore, are added to the distributed ledger and determination of the current state of each event object. A public distributed ledger is generally considered to be fully decentralized. On the other hand, a fully private distributed ledger is a distributed ledger in which permissions are kept centralized with one entity (i.e., the entity that controls/owns the private distributed trust computing network and the private distributed ledgers stored thereon). The permissions may be public or restricted to an arbitrary extent. And lastly, a consortium distributed ledger is a distributed ledger where the consensus process is controlled by a pre-selected set of nodes; for example, a distributed ledger may be associated with a specified number of member institutions, each of which operate in such a way that a quorum of the members must sign every event object for the event object to be valid. The right to access such a distributed ledger may be public or restricted to the participants. Consortium distributed ledgers may be considered partially decentralized.

As shown in FIG. 7, an exemplary distributed trust computing network 300 includes a distributed ledger 304 being maintained on multiple devices (nodes) 302 that are authorized to keep track of the distributed ledger 304. For example, the nodes 302 may be one or more computing devices such as a comprehensive computing system and one or more client device(s). Each node 302 in the distributed trust computing network 300 may have a complete or partial copy of the entire distributed ledger 304 or set of events and/or event objects 304-A on the distributed ledger 304. Events 304-A are initiated at a node and communicated to the various nodes in the distributed trust computing network 300. Any of the nodes 302 can validate an event, record the event to its copy of the distributed ledger 304, and/or broadcast the event, the validation of the event (in the form of an event object) and/or other data to other nodes 302.

FIG. 8 depicts an exemplary event object 304-A, i.e., data block. In embodiments of the present invention the event is generation of an NFT and the event object may store the NFT 230 and/or metadata 230-1 associated with the NFT 230. Event object 304-A includes an event header 306 and an event object data 308. The event header 306 may include a cryptographic hash of the previous event object 306-A; a nonce 306-B, i.e., a randomly generated 32-bit whole number; a cryptographic hash of the current event object 306-C wedded to the nonce 306-B; and a time stamp 306-D. The event object data 308 may include event information 308-A being recorded, such as NFT 230. Once the event object 304-A is generated, the event information 408-A is considered signed and forever tied to its nonce 306-B and hash 406-C. Once generated, the event object 304-A is then deployed on the distributed ledger 304. At this time, a distributed ledger address is generated for the event object 304-A, i.e., an indication of where the event object is located on the distributed ledger 304 and captured for recording purposes. Once deployed, the event information 308-A is considered recorded in the distributed ledger 304.

FIG. 9 illustrates an exemplary process of generating a secure token, such as a Non-Fungible Token (NFT) 230, in accordance with embodiments of the invention. One of ordinary skill in the art will readily appreciate that an NFT is a cryptographic record (referred to as a "token") that is linked to resources, such as, digital objects or in embodiments of the present invention IoT device identifiers and IoT device user identifiers or the like. NFT 230 may be stored on a distributed ledger 304 of a distributed trust computing network 300. The storage of the NFT 230 on the distributed ledger 304 or the storage of the metadata 230-1 means that various nodes 302 of the distributed trust computing network 300 have reached a consensus as to the ownership and validity/authenticity of NFT 230, i.e., the linked data.

As shown in FIG. 9, a system 1100 for generating an NFT 230. Generating, otherwise referred to as "minting", NFT 230, is initiated by first computing platform 200 (e.g., manufacturer/distributor 120) who identifies, using a first computing platform 200, resources 1102 that the user wishes to mint as an NFT. Typically, the resources 1102 used to generate the NFTs are digital objects that represent both tangible and intangible objects. These resources 1102 may include a piece of art, music, collectible, virtual world items, videos, real-world items such as artwork and real estate, or any other presumed valuable object. In accordance with the present invention resources 1102 may include IoT device identifier and IoT device user identifier. These resources 1102 are then digitized into a proper format to generate the NFT 230. NFT 230 may be a multi-layered documentation that identifies the resources 1102 but also evidences various event conditions associated therewith.

To record NFT 230 and/or NFT metadata 230-1 in a distributed ledger 304, an event object 304-A for the NFT 230 is created using data stored in database 1104. As previously discussed in relation to FIG. 8, the event object 304-A includes an event object header 306 and an event object data 308. The event object header 306 includes a cryptographic hash of the previous event object, a nonce (i.e., a random 32-bit whole number generated when the event object is created), a cryptographic hash of the current event object wedded to the nonce, and a time stamp. The event object data 308 includes the NFT 230 and/or metadata 230-1 being recorded. Once the event object 304-A is generated, NFT 230 is considered signed and persistently tied to its corresponding nonce and hash. The event object 304-A is then deployed in the distributed ledger 304. At this time, a distributed ledger address is generated for the event object 304-A, i.e., an indication of where NFT 230 is located on the distributed ledger 304 and captured for recording purposes. Once deployed, NFT 230 is linked permanently to the corresponding hash and the distributed ledger 304, and is considered recorded in the distributed ledger 304, thus concluding the generation/minting process.

As shown in FIG. 9 and previously discussed in relation to FIG. 7, the distributed ledger 304 may be maintained on multiple devices (nodes) 302 of the distributed trust computing network 300; the multiple nodes 302 are authorized to keep track of the distributed ledger 304. For example, the multiple nodes 302 may be computing devices such as a computing system or end-point device(s). Each node 302 may have a complete or partial copy of the entire distributed ledger 304 or set of events and/or event objects on the distributed ledger 304. Events, such as the recordation of NFT 230, are initiated at a node 302 and communicated to the various nodes 402. Any of the nodes 302 can validate an event, record the event to the corresponding copy of the distributed ledger 304, and/or broadcast the event, its validation (in the form of an event object 304-A) and/or other data to other nodes 302.

FIG. 10 illustrates an exemplary NFT 230 as a multi-layered documentation of a resource 1102, in accordance with an embodiment of an invention. As shown in FIG. 10, the NFT 230 may include at least relationship layer 232, a token layer 234, a metadata layer 236, and, when applicable, a licensing layer 238. The relationship layer 232 may include ownership information 232-1, including a map of various users that are associated with the resource and/or the NFT 230, and their relationship to one another. For example, if the NFT 230 is acquired by user U1 from a user U2, the relationship between U1 and U2 is recorded in the relationship layer 232. In another example, if the NFT 230 is owned by O1 and the resource itself is stored in a storage facility by storage provider SP1, then the relationship between O1 and SP1 as owner-file storage provider is recorded in the relationship layer 232. The token layer 234 may include a token identification number 234-1 that is used to identify the NFT 230. The metadata layer 236 may include at least a resource location 236-1 and a resource descriptor 236-2. The resource location 236-1 provides information associated with the specific location of the resource 1002. Depending on the conditions listed in the smart contract underlying the distributed ledger 404, the resource 1102 may be stored on-chain, i.e., directly on the distributed ledger 404 along with the NFT 230, or off-chain, i.e., in an external storage location. The resource location 236-1 identifies where the resource 1002 is stored. The resource descriptor 236-2 includes specific information associated with the resource itself. For example, the resource descriptor 236-2 may include information about the supply, authenticity, lineage, provenance of the resource 1002. The licensing layer 238 may include any transferability parameters 238-1 associated with the NFT 230, such as restrictions and licensing rules associated with purchase, sale, and any other types of transfer of the resource 1002 and/or the NFT 230 from one person to another. Those skilled in the art will appreciate that various additional layers and combinations of layers can be configured as needed without departing from the scope and spirit of the invention.

Thus, present embodiments of the invention provide for real-time transmission of IoT telemetry data to a third-party and use of such data by the third-party for purposes of determining IoT device-related recommendations specific to the IoT device user. The invention relies on machine learning models which receive, as a least a part of the inputs, the IoT telemetry data, to determine recommendations that are tied to the IoT device and specific to the IoT device user. Non Fungible Tokens (NFTs) are relied upon that are minted by the IoT device manufacturer/distributor and hold a link to an IoT device identifier and an IoT device user identifier and include a smart contract formed between the third-party and the IoT device user that defines the criteria for the telemetry data that is to be acquired by the third-party. Use of the NFT allows for IoT gateways/data listeners to determine which IoT telemetry data is to be transmitted to the third-party and allows for the transmission to occur without identifying the IoT user in the transmissions.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for third-party acquisition of Internet-of-Things (IoT) device telemetry data and using the IoT device telemetry data to determine IoT device-related recommendations, the system comprising:
a plurality of IoT devices, each IoT device associated with an IoT identifier and comprising:
a first memory,
one or more first processing devices in communication with the first memory,
one or more sensors in communication with at least one of one or more first processing devices and configured for capturing telemetry data, and
a Non-Fungible Token (NFT) digital wallet stored in the memory and accessible via at least one of the one or more first processing devices;
a first computing platform including a first memory and one or more first processing devices in communication with the first memory, wherein the first memory stores a minting and transfer application that is executable by at least one of the one or more first processing devices and configured to:
receive a plurality of NFT templates issued from a third-party requesting acquisition of IoT device telemetry data, wherein the plurality of NFT templates define criteria for acquiring IoT device telemetry data,
in response to receiving the plurality of NFT templates, mint a plurality of NFTs, wherein each NFT (i) corresponds to a NFT template from amongst the plurality of NFT templates, (ii) provides at least one link to an IoT device identifier and an IoT device user identifier accessible only through the NFT and (iii) includes a smart contract, formed between the third-party and an IoT device user, wherein the smart contract defines telemetry data access conditions that permit data acquisition without disclosing the IoT device user's identity in transmitted data, and based upon at least a portion of the criteria for acquiring IoT device telemetry data, and
in response to minting the plurality of NFTs, transfer NFT access rights for accessing each of the NFTs to the NFT digital wallet in a corresponding one of the IoT devices and the third-party;
a second computing platform including a second memory and one or more second processing devices in communication with the second memory, wherein the second memory stores an IoT telemetry data listener application that is executable by at least one of the one or more second processing devices and configured to:
use the IoT device identifier to query distributed ledgers of a distributed trust computing network that store the plurality of NFTs to determine the criteria for acquiring IoT device telemetry data from the corresponding one of the IoT devices,
in response to determining the IoT device the criteria for acquiring IoT device telemetry data, listen for IoT device telemetry data that meets the criteria for acquiring IoT device telemetry data and transmit, to the third-party, the IoT device telemetry data that meets the criteria, wherein the transmitted telemetry data excludes any identification of the IoT device user; and
a third computing platform including a third memory and one or more third processing devices in communication with the third memory, wherein the third memory stores a recommendation engine comprising one or more machine-learning algorithms that are executable by at least one of the one or more third processing devices and configured to:
in response to the third-party receiving the IoT device telemetry data and accessing the NFT to identify the IoT device user, receive inputs that include the IoT device telemetry data, identification of an IoT device from which the IoT device telemetry data was acquired and identification of the IoT device user, and
in response to receiving the inputs, determine one or more IoT device-related recommendations that are specific to the IoT device user.

2. The system of claim 1, wherein the NFT minting and transfer application is further configured to receive the plurality of NFT templates issued from the third-party requesting acquisition of IoT device telemetry data, wherein the plurality of NFT templates define the criteria for acquiring IoT device telemetry data, wherein the criteria includes IoT device events that trigger IoT device telemetry data retrieval and IoT device telemetry data to be retrieved in response to a corresponding IoT device event.

3. The system of claim 1, wherein the NFT minting and transfer application is further configured to receive the plurality of NFT templates issued from the third-party requesting acquisition of IoT device telemetry data, wherein the plurality of NFT templates define the criteria for acquiring IoT device telemetry data, wherein the criteria includes at least one classification of IoT device user.

4. The system of claim 1, wherein the NFT minting and transfer application is further configured to receive the plurality of NFT templates issued from the third-party requesting acquisition of IoT device telemetry data, wherein each of the plurality of NFT templates include the at least one link, wherein the at least one link is one or more Universal Resource Locators (URLs) associated with an Interplanetary File System (IPFS) storage location.

5. The system of claim 1, wherein the first computing platform is controlled by an IoT device manufacturer or distributor.

6. The system of claim 1, wherein the second computing platform comprises an edge computing platform configured to provide real-time transmission of the IoT device telemetry data to the third-party.

7. The system of claim 6, wherein the edge computing platform implements a bridge protocol to provide real-time transmission of the IoT device telemetry data to the third-party.

8. The system of claim 7, wherein the bridge protocol is configured to provide real-time transmission of the IoT device telemetry data by streaming the IoT telemetry data to a cloud computing platform, transforming, at the cloud computing platform, the IoT telemetry data to Simple Notification Service (SNS) message service format and delivering SNS messages comprising the IoT telemetry device to an Application Programming Interface (API) gateway controlled by the third-party.

9. The system of claim 1, wherein the NFT minting and transfer application is executed and the NFTs are minted as a result of virtual computing environment interaction between at least two of the third-party, the IoT device user and an IoT device manufacturer or distributor.

10. The system of claim 9, wherein the recommendation engine further comprises recommendation presentation application that is configured to present the recommendations to the IoT device user within the virtual computing environment.

11. The system of claim 9, wherein the NFT minting and transfer application is further configured to receive the plurality of NFT templates, wherein the plurality of NFT templates define virtual computing environment events that require associated data to be transmitted to the third-party and wherein the smart contract is further based upon the virtual computing environment events that require associated data to be transmitted to the third-party.

12. The system of claim 11, further comprising a fourth computing platform including a fourth memory and one or more fourth processing devices in communication with the fourth memory, wherein the fourth memory stores a virtual computing event listener application that is executable by at least one of the one or more fourth processing devices and configured to:
  use the IoT device identifier to query distributed ledgers of a distributed trust computing network that store the plurality of NFTs to determine the virtual computing environment events that require associated data to be transmitted to the third-party; and
  in response to determining the virtual computing environment events, listen for the virtual computing environment events and transmit, to the third-party, the data associated with the virtual computing environment events.

13. The system of claim 12, wherein the recommendation engine is further configured to:
  in response to the third-party further receiving the data associated with the virtual computing environment events, receive inputs that further include the data associated with the virtual computing environment events.

14. A computer-implemented method for third-party acquisition of Internet-of-Things (IoT) device telemetry data and using the IoT device telemetry data to determine IoT device-related recommendations, the method executed by one or more computing processor devices, the method comprises:
  receiving a plurality of NFT templates issued from a third-party requesting acquisition of IoT device telemetry data, wherein the plurality of NFT templates define criteria for acquiring IoT device telemetry data;
  in response to receiving the plurality of NFT templates, minting a plurality of NFTs, wherein each NFT (i) corresponds to a NFT template from amongst the plurality of NFT templates, (ii) provides at least one link to an IoT device identifier and an IoT device user identifier and (iii) includes a smart contract, wherein the smart contract defines criteria for acquiring telemetry data without disclosing the IoT device user's identity in the transmitted data, formed between the third-party and an IoT device user, and based upon at least a portion of the criteria for acquiring IoT device telemetry data;
  in response to minting the plurality of NFTs, transferring NFT access rights for accessing each of the NFTs to an NFT digital wallet stored in a corresponding IoT device and the third-party;
  using the IoT device identifier to query distributed ledgers of a distributed trust computing network that store the plurality of NFTs to determine the criteria for acquiring IoT device telemetry data;
  in response to determining the IoT device the criteria for acquiring IoT device telemetry data, listening for IoT device telemetry data that meets the criteria for acquiring IoT device telemetry data and transmitting, to the third-party, the IoT device telemetry data that meets the criteria, wherein the transmitted telemetry data excludes any identification of the IoT device user;
  in response to the third-party receiving the IoT device telemetry data and accessing the NFT to identify the IoT device user, receiving, at machine learning models, inputs that include the IoT device telemetry data, identification of an IoT device from which the IoT device telemetry data was acquired and identification of the IoT device user; and
  in response to receiving the inputs, determining one or more IoT device-related recommendations that are specific to the IoT device user.

15. The method of claim 14, wherein receiving further comprises receiving the plurality of NFT templates issued from the third-party requesting acquisition of IoT device telemetry data, wherein the plurality of NFT templates define criteria for acquiring IoT device telemetry data, wherein the criteria includes at least one chosen from the group consisting of (i) IoT device events that trigger IoT device telemetry data retrieval and IoT device telemetry data to be retrieved in response to a corresponding IoT device event and (ii) at least one classification of IoT device user.

16. The method of claim 14, wherein transmitting, to the third-party, the IoT device telemetry data that meets the criteria further comprises implementing a bridge protocol to provide real-time transmission of the IoT device telemetry data to the third-party.

17. The method of claim 14, wherein minting further comprises, in response to virtual computing environment interaction between at least two of the third-party, the IoT device user and an IoT device manufacturer or distributor, minting the plurality of NFTs and wherein the method further comprises presenting the recommendations to the IoT device user within the virtual computing environment.

18. A computer program product comprising:
  a non-transitory computer-readable medium comprising sets of codes for causing one or more computing processing devices to:
  receive a plurality of NFT templates issued from a third-party requesting acquisition of IoT device telemetry data, wherein the plurality of NFT templates define criteria for acquiring IoT device telemetry data;
  in response to receiving the plurality of NFT templates, mint a plurality of NFTs, wherein each NFT (i) corresponds to a NFT template from amongst the plurality of NFT templates, (ii) provides at least one link to an IoT device identifier and an IoT device user identifier and (iii) includes a smart contract, wherein the smart contract defines criteria for acquiring telemetry data without disclosing the IoT device user's identity in the transmitted data, formed between the third-party and an IoT device user, and based upon at least a portion of the criteria for acquiring IoT device telemetry data;
  in response to minting the plurality of NFTs, transfer NFT access rights for accessing each of the NFTs to an NFT digital wallet stored in a corresponding IoT device and the third-party;
  use the IoT device identifier to query distributed ledgers of a distributed trust computing network that store the plurality of NFTs to determine the criteria for acquiring IoT device telemetry data;
  in response to determining the IoT device the criteria for acquiring IoT device telemetry data, listen for IoT device telemetry data that meets the criteria for acquiring IoT device telemetry data and transmit, to the third-party, the IoT device telemetry data that meets the criteria, wherein the transmitted telemetry data excludes any identification of the IoT device user;

in response to the third-party receiving the IoT device telemetry data and accessing the NFT to identify the IoT device user, receive, at machine learning models, inputs that include the IoT device telemetry data, identification of an IoT device from which the IoT device telemetry data was acquired and identification of the IoT device user; and in response to receiving the inputs, determine one or more IoT device-related recommendations that are specific to the IoT device user.

19. The computer program product of claim 18, wherein the set of codes for causing one or more computing processing devices to receive a plurality of NFT templates further cause the one or more computing processor devices to receive a plurality of NFT templates issued from the third-party requesting acquisition of IoT device telemetry data, wherein the plurality of NFT templates define criteria for acquiring IoT device telemetry data, wherein the criteria includes at least one chosen from the group consisting of (i) IoT device events that trigger IoT device telemetry data retrieval and IoT device telemetry data to be retrieved in response to a corresponding IoT device event and (ii) at least one classification of IoT device user.

20. The computer program product of claim 18, wherein the set of codes for causing one or more computing processing devices to transmit, to the third-party, the IoT device telemetry data further cause the one or more computing processor devices to implement a bridge protocol to provide real-time transmission of the IoT device telemetry data to the third-party.

\* \* \* \* \*